(12) United States Patent
Young et al.

(10) Patent No.: US 8,371,611 B2
(45) Date of Patent: Feb. 12, 2013

(54) RUPTURE FEATURE FOR INFLATOR OF VEHICLE AIRBAG

(75) Inventors: Anthony M. Young, Malad, ID (US); Andrew J. Young, Brigham City, UT (US); Kurt L. Gamill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 187 days.

(21) Appl. No.: 12/687,353

(22) Filed: Jan. 14, 2010

(65) Prior Publication Data

US 2011/0169252 A1 Jul. 14, 2011

(51) Int. Cl.
*B60R 21/274* (2006.01)

(52) U.S. Cl. .................. 280/737; 137/68.19; 137/68.27

(58) Field of Classification Search .................. 280/737; 137/68.19, 68.23, 68.27, 68.28
See application file for complete search history.

(56) References Cited

U.S. PATENT DOCUMENTS

| | | | | |
|---|---|---|---|---|
| 2,576,431 A * | 11/1951 | White | ............................ | 220/89.2 |
| 3,856,181 A * | 12/1974 | Merrell | ............................ | 222/5 |
| 3,865,273 A * | 2/1975 | Zeigler | ............................ | 222/5 |
| 3,868,124 A * | 2/1975 | Johnson | ............................ | 280/737 |
| 3,869,143 A * | 3/1975 | Merrell | ............................ | 280/737 |
| 3,968,980 A * | 7/1976 | Hay | ............................ | 280/734 |
| 5,456,492 A * | 10/1995 | Smith et al. | ............................ | 280/737 |
| 5,516,144 A * | 5/1996 | Headley et al. | ............................ | 280/730.2 |
| 5,531,473 A * | 7/1996 | Rink et al. | ............................ | 280/737 |
| 5,609,362 A * | 3/1997 | Sparks et al. | ............................ | 280/741 |
| 5,670,738 A * | 9/1997 | Storey et al. | ............................ | 102/530 |
| 5,884,938 A * | 3/1999 | Rink et al. | ............................ | 280/741 |
| 6,145,877 A | 11/2000 | Rink et al. | | |
| 6,286,702 B1 * | 9/2001 | Buermann | ............................ | 220/229 |
| 6,295,935 B1 * | 10/2001 | Swann et al. | ............................ | 102/530 |
| 2004/0195812 A1 * | 10/2004 | Canterberry et al. | ............................ | 280/737 |
| 2005/0173906 A1 * | 8/2005 | Nakayasu et al. | ............................ | 280/737 |
| 2005/0236821 A1 * | 10/2005 | Hofmann et al. | ............................ | 280/737 |

* cited by examiner

*Primary Examiner* — Ruth Ilan
*Assistant Examiner* — Barry Gooden, Jr.
(74) *Attorney, Agent, or Firm* — Sally J. Brown; Madson IP

(57) ABSTRACT

A rupture feature releases pressurized gas into a diffuser through an egress opening in an inflator wall responsive to a pressure impulse in the inflator. A sturdy rupture fragment is positioned opposite the egress opening. A thin rupture membrane continuously circumscribes and sealingly interconnects the rupture fragment to the inflator about the egress opening. Rupture membrane thickness is less than rupture fragment thickness or inflator wall thickness at the egress opening. The rupture membrane is upstanding from the inflator wall about the egress opening to a constant height. The rupture fragment and the rupture membrane are integrally-formed with each other and with the inflator wall at the egress opening. The pressure impulse impacts the rupture fragment, urges the rupture fragment away from the inflator, detaches the rupture fragment from the inflator by fully transversely fracturing the rupture membrane, and drives the rupture fragment into containment within the diffuser.

19 Claims, 4 Drawing Sheets

RUPTURE FEATURE FOR INFLATOR OF VEHICLE AIRBAG

BACKGROUND OF THE INVENTION

1. Field of the Invention

The present invention relates to vehicle passenger safety modules that use pressurized gas from an inflator to deploy an airbag between passengers and the interior of a vehicle in the event of a collision. In particular, the present invention pertains to the structure associated with the inflator that effects the abrupt release of the pressurized inflation gas contained therein.

2. Background

An airbag for a vehicle passenger safety module includes an inflation portion that captures pressurized gas from an inflator, thereby becoming a gas-filled cushion interposed between a vehicle occupant and the interior vehicle surfaces surrounding that occupant.

The inflator is ignited electrically in response to a signal from a momentum monitor carried in the vehicle. The inflator is a closed structure having walls sufficiently sturdy to safely retain inflation gas at high pressures. The pressurized inflation gas is released from the inflator at a high velocity by abruptly opening the discharge end of the inflator. The inflation gas initially passes through a gas diffuser that redirects the inflation gas in directions and in quantities that are optimally suited to nondestructively but efficiently inflate an airbag cushion.

The structure actually effecting the abrupt opening of the inflator is the rupture features of the inflator. The rupture feature is activated in response to a pressure impulse of predetermined amount generated in the inflator.

A typical rupture feature employs a thin rupture disc that is supported about the periphery thereof across the intended outflow path of pressurized inflation gas. The rupture disc is secured to the interior of a sturdy frame component that is used to close the discharge end of the inflator. A pressure impulse of predetermined amount generated in the inflator causes destructive forces in the rupture disc that burst the rupture disc permitting the pressurized inflation gas in the inflator to escape at high velocity.

BRIEF SUMMARY OF THE INVENTION

According to teachings of the present invention, a rupture feature for releasing pressurized gas from an inflator of a vehicle passenger safety airbag discharges the pressurized gas into a diffuser through an egress opening in the wall of the inflator in response to a predetermined pressure impulse arising in the inflator. The rupture feature includes a sturdy rupture fragment of reliably stable configuration positioned opposite the egress opening in an orientation calculated to be impacted by the predetermined pressure impulse, and a relatively thin rupture membrane continuously circumscribing the periphery of the rupture fragment and sealingly interconnecting the rupture fragment to the wall of the inflator about the egress opening. Optionally, the rupture fragment may be circularly symmetric and substantially planar or have any other suitable configuration.

The rupture membrane is upstanding from the wall of the inflator about the egress opening at a height measured between the wall of the inflator and the periphery of the rupture fragment that is constant about the egress opening, and the thickness of the rupture membrane is less than the thickness of the rupture fragment and less than the thickness of the wall of the inflator at the egress opening.

The impact of the predetermined pressure impulse against the rupture fragment urges the rupture fragment away from the inflator, detaching the rupture fragment from the inflator by fully transversely fracturing the rupture membrane. The fracturing of the rupture membrane in turn permits the pressurized gas stored within the inflator to drive the rupture fragment safely into confinement in the diffuser.

In another aspect of the present invention, a pressurized gas release and diffusion assembly for a gas egress opening in the wall of the inflator for a vehicle passenger safety airbag includes a gas guide secured to the exterior of the wall of the inflator about the egress opening and a generally planar rupture fragment of reliably stable configuration mechanically associated with the inflator wall interior of the gas guide. The rupture fragment is positioned generally parallel to the plane of the egress opening intermediate the egress opening and the gas guide. A continuous rupture membrane integrally formed with the inflator wall and with the rupture fragment sealingly interconnects the periphery of the rupture fragment to the wall of the inflator about the egress opening.

Typically, the gas guide includes an end wall separated from and opposing the egress opening, a continuous skirt having a first edge circumscribing the periphery of the end wall and a second edge opposite therefrom attached to the exterior of the wall of the inflator about the egress opening. A plurality of circumferentially-spaced diffusion apertures are formed through the skirt, affording escape from the assembly for pressurized gas from the inflator.

Pressurized gas in the inflator is released and diffused by the assembly responsive to a predetermined pressure impulse arising in the inflator. The predetermined pressure impulse urges the rupture fragment away from the inflator, detaches the rupture fragment from the inflator at the rupture membrane, and drives the rupture fragment against an inner surface of the gas guide.

Yet a further aspect of the present invention pertains to a release structure for pressurized gas in an inflator for a vehicle passenger safety airbag. The release structure, which opens responsive to a predetermined pressure impulse arising in the inflator, includes a gas egress opening formed through the wall of the inflator, a barrier positioned outside the inflator opposite the egress opening in an orientation calculated to be impacted by the predetermined pressure impulse, and a frangible sleeve sealingly interconnecting the periphery of the barrier to the wall of the inflator about the egress opening.

The present invention also contemplates methods for manufacturing a rupture feature for an inflator for a vehicle passenger safety airbag. One such embodiment of a method commences by developing a gas egress opening through a wall of the inflator. The egress opening is enclosed from the exterior of the inflator in a hollow boss having a closed top remote from the inflator and a continuous sidewall sealingly connecting the top of the boss to the wall of the inflator about the egress opening. The steps of developing and of enclosing may be performed simultaneously by integrally forming the portion of the wall of the inflator at the intended location of the egress opening into the boss itself. At some point in the process, the sidewall of the boss is thinned to such an extent that a predetermined pressure impulse arising in the inflator will, by urging the top of the boss away from the inflator, detach the top of the boss from the wall of the inflator by fully transversely fracturing the sidewall of the boss.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof, which are illustrated in the appended drawings. Understanding that these drawings depict only typical embodiments of the present invention and are not therefore to be considered to be limiting of scope thereof, the present invention will be described and explained with additional specificity and detail through the use of the accompanying drawings in which.

DETAILED DESCRIPTION OF THE INVENTION

The present invention will be best understood by reference to the drawings, wherein like parts are designated by like numerals throughout. The components of the present invention, as generally described and illustrated in the figures herein, could be arranged and designed in a wide variety of different configurations. Thus, the following more detailed description of the embodiments of the present invention, as represented in FIGS. 1-6, is not intended to limit the scope of the invention, as claimed, but is merely representative of selected presently preferred embodiments of the invention.

Figure 1:
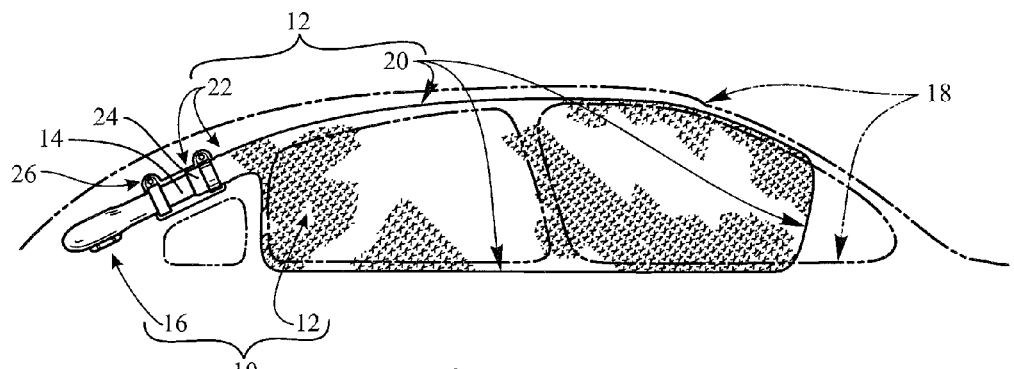
FIG. 1 is an elevation view, superimposed against a profile in phantom of the side windows of a typical passenger vehicle, of an inflated curtain airbag for a vehicle passenger safety module that is attached to the discharge end of an inflator incorporating teachings of the present invention.

FIG. 1 is an elevation view of a vehicle passenger safety module 10 that includes a curtain airbag 12 communicating with a discharge end 14 of an inflator 16. Inflator 16 incorporates teachings of the present invention by including a rupture feature that is not, however, visible in FIG. 1. The inventive rupture feature abruptly releases pressurized inflation gas from discharge end 14 of inflator 16 for high velocity passage into airbag 12. For perspective, these elements of safety module 10 are superimposed against a profile in phantom of a side of a typical passenger vehicle 18. Airbag 12 includes an inflation portion 20 that becomes a protective cushion by capturing pressurized inflation gas from inflator 14, and a sleeve-like inlet portion 22 that communicates inflation gas into inflation portion 20. The open end 24 of inlet portion 22 of inflator 12 has been advanced over discharge end 14 of inflator 16 and secured thereabout by an attachment bracket 26.

Figure 2:
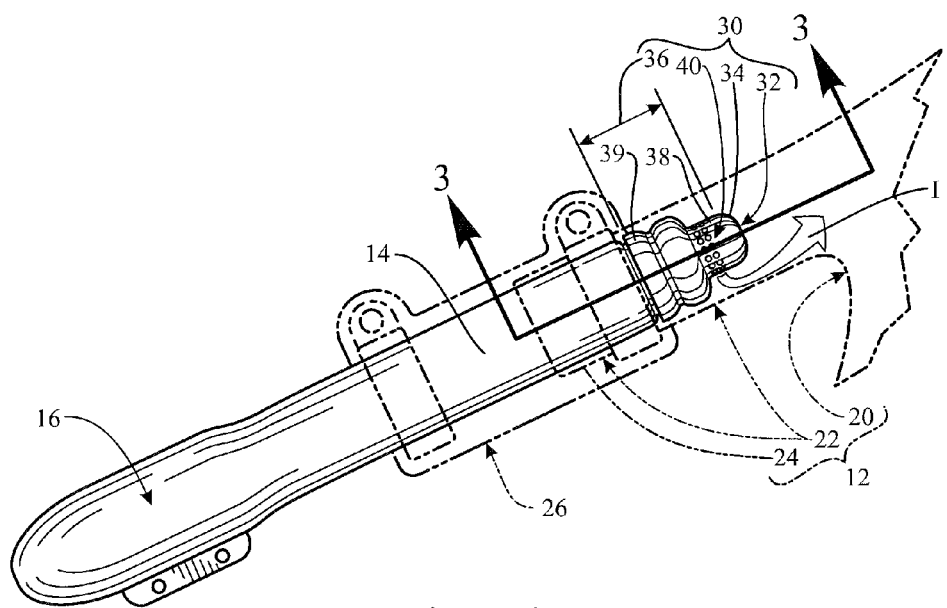
FIG. 2 is an enlarged view of the discharge end of the inflator of FIG. 1 and a diffuser mounted thereon.

FIG. 2 is an enlarged view of an assembly that includes inflator 16 and a diffuser 30 mounted to the exterior of discharge end 14 thereof. Discharge end 14 of inflator 16 with diffuser 30 mounted thereon is shown extending into open end 24 of inlet portion 22 of airbag 12, which in FIG. 2 is shown in phantom. Diffuser 30 obscures from view the inventive rupture feature of inflator 16 mentioned earlier. Diffuser 30 is a cap-like structure having an end wall 32 with a periphery 34 circumscribed by a continuous skirt 36. Skirt 36 has a first edge 38 that is attached to periphery 34 of end wall 32 and a second edge 39 opposite therefrom that effects the attachment of diffuser 30 to the exterior of inflator 16. A plurality of circumferentially-spaced diffusion apertures 40 formed through skirt 36 communicate with an interior space created between the inner surface of diffuser 30 and the outer surface of discharge end 14 of inflator 16 when diffuser 30 is mounted thereto. Inflation gas from inflator 16 rushes into that interior space and is then deflected radially outwardly from the assembly of inflator 16 and diffuser 30 through diffusion apertures 40 as inflation gas I. This is suggested by the correspondingly labeled arrow in FIG. 2.

Figure 3:
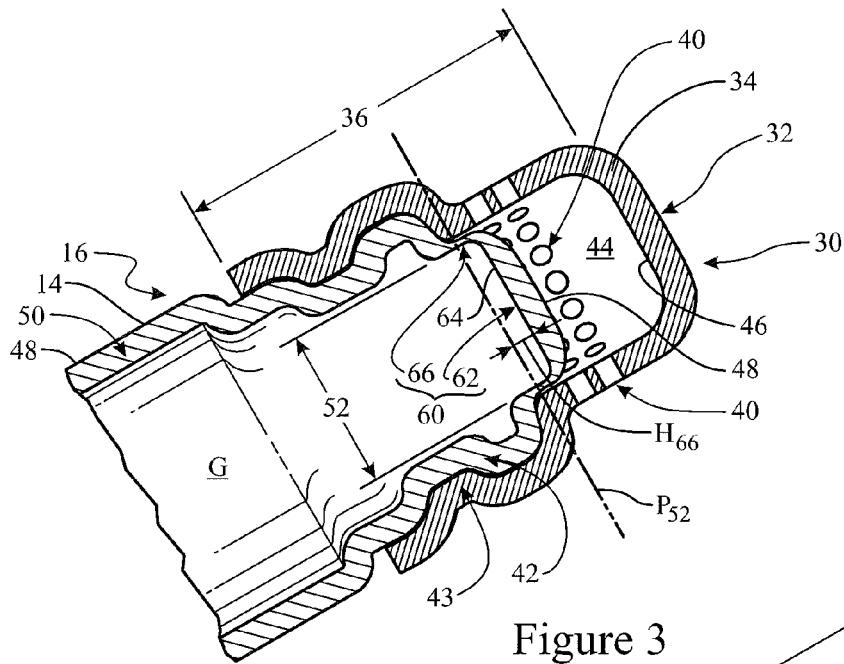
FIG. 3 is a cross-sectional view of the inflator and the diffuser of FIG. 2 taken along section line 3-3 shown therein, revealing between the inflator and the diffuser an embodiment of an rupture feature incorporating teachings of the present invention.

FIG. 3 is a cross-sectional view of inflator 16 and diffuser 30 of FIG. 2 taken along section line 3-3 therein. Inflator 16 and diffuser 30 include a cooperating connection structure 42 and a cooperating connection structure 43, respectively, by which diffuser 30 is mounted to discharge end 14 of inflator 16, as for example by crimping, press fitting, welding or threading. While discharge end 14 of inflator 16 as a result extends well into diffuser 30, an interior space 44 is retained in the resulting assembly between the inner surface 46 of diffuser 30 and the outer surface 48 of inflator 16. Interior space 44 communicates with the exterior of the assembly of inflator 16 and diffuser 30 through diffusion apertures 40.

Inflator 16 is a tubular structure with an outer wall 50 of sufficient sturdiness to contain a quantity of pressurized inflation gas G with which to fill a passenger safety airbag. At discharge end 14 of inflator 16 outer wall 50 surrounds an egress opening 52 through which inflation gas is intended to be discharged in an abrupt manner into interior space 44 in the case of a collision involving the passenger vehicle in which inflator 16 is installed. Toward that end, inflator 16 is provided at egress opening 52 with an embodiment of a rupture feature 60 incorporating teachings of the present invention.

Rupture feature 60 includes a sturdy rupture fragment 62 of reliably stable configuration that is positioned opposite egress opening 52 generally parallel to the transverse plane $P_{52}$ thereof at an orientation calculated to be impacted by any significant pressure impulse developed in inflation gas G. Rupture fragment 62 is a substantially planar, circularly-symmetric element with a surface 64. A relatively thin rupture membrane 66 continuously circumscribes surface 64 of rupture fragment 62 and sealingly interconnects rupture fragment 62 to outer wall 50 of inflator 16 about egress opening 52.

Rupture membrane 66 may be integrally formed with rupture fragment 62 and with outer wall 50 of inflator 16. In this manner, the number of components in a typical vehicle passenger safety module is reduced, and the manufacturing steps required to assemble those components can be streamlined. Alternatively, and without departing from teachings of the present invention, rupture membrane 66 may be integrally formed only with rupture fragment 62 and then attached by suitable processes while carrying rupture fragment 62 to outer wall 50 of inflator 16. It is also within the teachings of the present invention to use such processes to attach rupture fragment 62 to a rupture membrane that has previously been formed with outer wall 50 of inflator 16. Indeed, rupture feature 60 may be assembled at egress opening 52 from distinctly manufactured elements corresponding to each of or to constituent components of rupture fragment 62 and rupture membrane 66.

In any case, rupture feature 60 may be viewed as a hollow boss having a closed top and a continuous sidewall of relatively thin aspect sealingly connecting the top of the boss to outer wall 50 of inflator 16 about egress opening 52.

Rupture membrane 66 is upstanding from outer wall 50 of inflator 16 to a height $H_{66}$ measured between outer wall 50 and periphery 64 of rupture fragment 62 that is constant about egress opening 52. Generally, the thickness of at least a circumferentially continuous, encircling portion of rupture membrane 66 is less than the thickness of rupture fragment 62 and less than the thickness of outer wall 50 of inflator 16. That thickness is so designed as to enable rupture membrane 66 to fail mechanically and completely separate laterally between inflator 16 and rupture fragment 62, when subjected to a predetermined amount of tension. Further, to best prevent gas leakage through the thin region of the rupture membrane 66, the grain of the material in the rupture membrane 66 is oriented parallel to the length of the thin region.

The predetermined amount of tension that will cause rupture membrane 66 to fail in such a manner is by design calculated to correspond to an amount of the tension produced in rupture membrane 66 under conditions in which the passenger vehicle containing inflator 16 is in a collision. Under those conditions, responsive to electrical signals from the momentum monitor carried in the vehicle, a predetermined pressure impulse is developed in inflation gas G within inflator 16. The predetermined pressure impulse in inflation gas G impacts against surface 64, urging rupture fragment 62 away from inflator 16. This causes tension in rupture membrane 66 that fully transversely fractures rupture membrane 66 intermediate inflator 16 and diffuser 30. Rupture fragment 62 detaches from inflator 16, and inflation gas G is released abruptly from inflator 16 through diffuser 30 into an associated passenger safety airbag, as will be seen subsequently in FIGS. 5A-5C. To assure that repeatable and reliable fracture occurs as a result of the predetermined pressure impulse, the rupture feature 60 is loaded such that the predetermined pressure impulse produces tension in the material of the rupture membrane 66 at the desired frangible region.

Figure 4:
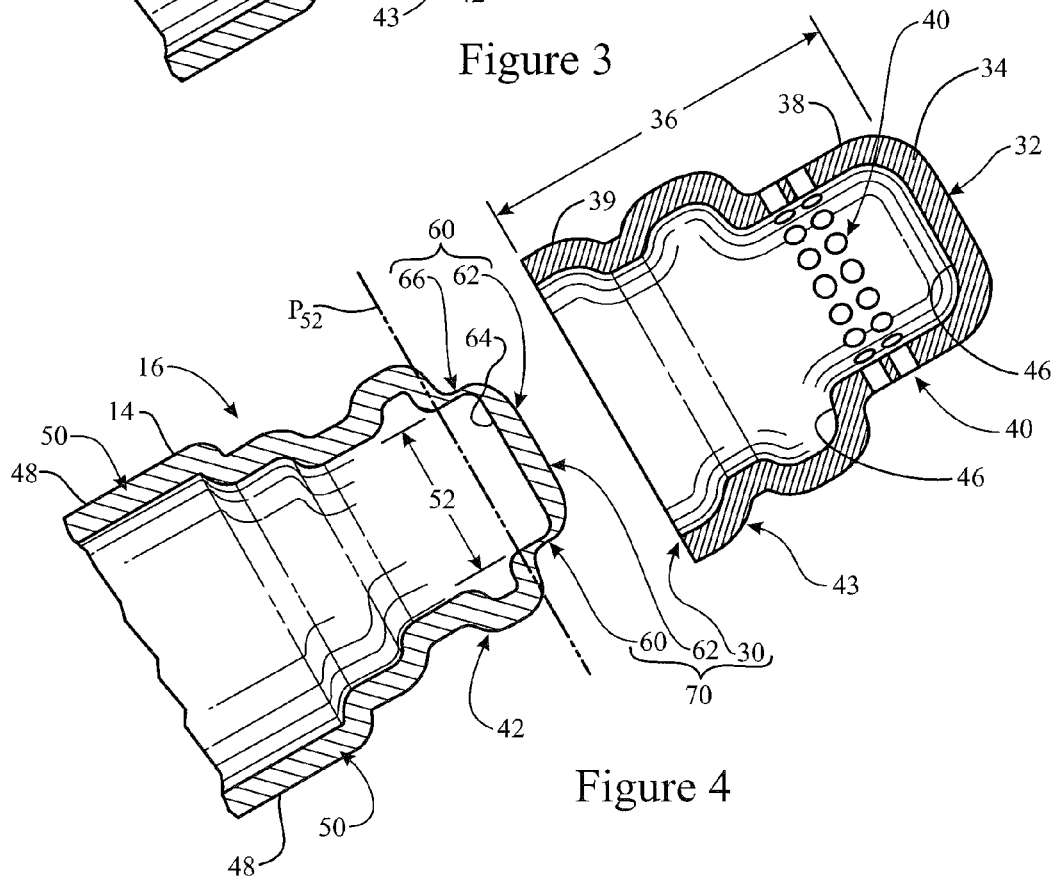
FIG. 4 is a disassembled view of the inflator, the rupture feature, and diffuser of FIG. 3.

In FIG. 4, diffuser 30 has been disassembled from inflator 16. Focusing on egress opening 52 in discharge end 14 of inflator 16, teachings of the present invention can alternatively be characterized as including a pressurized gas release and diffusion assembly 70 for a gas egress opening in the wall of the inflator for a vehicle passenger safety airbag. Assembly 70 includes diffuser 30, which functions as a gas guide secured to the exterior of outer wall 50 of inflator 16 about egress opening 52, and the elements of rupture feature 60 enclosed by the gas guide. Those elements of rupture feature 60 include rupture fragment 62, which functions as a barrier positioned outside inflator 16 opposite from egress opening 52 in an orientation calculated to be impacted by a pressure impulse arising in pressurized gas G, and rupture membrane 66, which functions as a frangible sleeve sealingly interconnecting the periphery of the barrier to outer wall 50 of inflator about egress opening 52. When a pressure impulse of predetermined amount arises in pressurized gas G in inflator 16, the impact of that pressure impulse against the barrier of rupture feature 60 separates the barrier from inflator 16 at the frangible sleeve, and pressurized gas G escapes at a high velocity from assembly 70 in directions determined by the physical particulars of the gas guide of assembly 70.

Focusing on inflator 16 alone, teachings of the present invention can additionally be characterized as including a release structure for pressurized gas G in inflator 16 that opens in response to a predetermined pressure impulse arising in inflator 16. The release structure includes gas egress opening 52 formed through outer wall 50 of inflator 16, a generally planar rupture fragment, such as rupture fragment 62, of reliably stable configuration mechanically associated with outer wall 50 and positioned apart from and generally parallel to transverse plane $P_{52}$ of egress opening 52, and a continuous rupture membrane integrally formed with outer wall 50 sealingly interconnecting the periphery of the rupture fragment to outer wall 50 of inflator 16 about egress opening 52. Hence, the gas flow orifice created upon the rupture of the rupture membrane 66 is known and repeatable, thereby eliminating variability in the flow rate of the pressurized gas from the inflator 16.

Figure 5A:
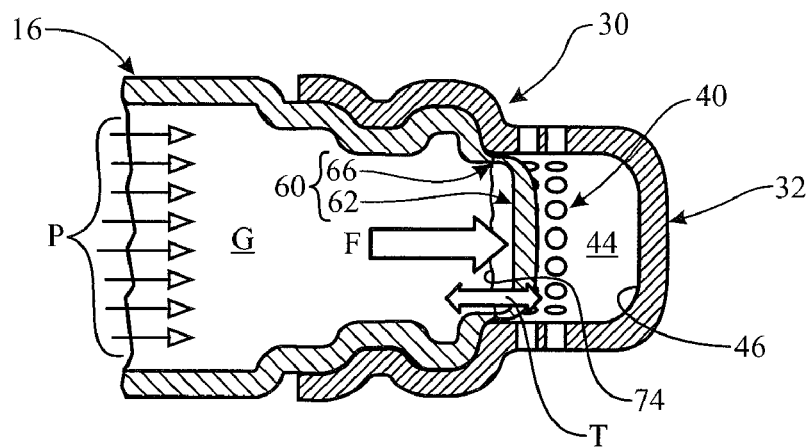
FIGS. 5A-5C constitute a series of diagrams depicting in temporal sequence stages in the operation of the inventive rupture feature shown in FIGS. 3 and 4.
Figure 5B:
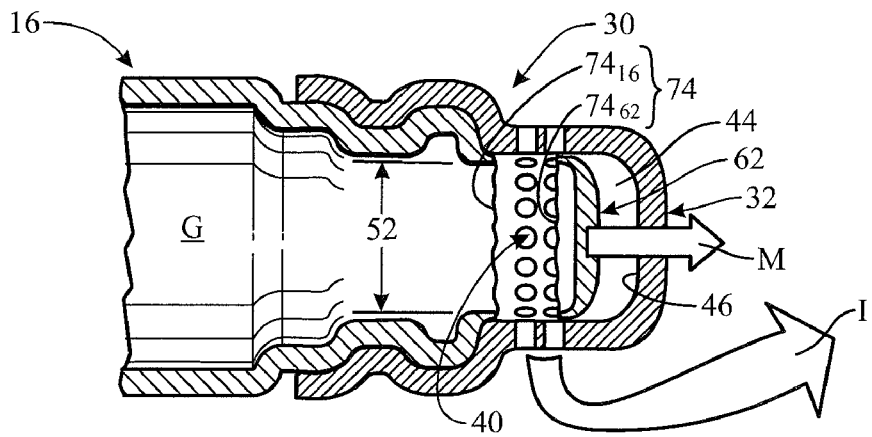
Figure 5C:
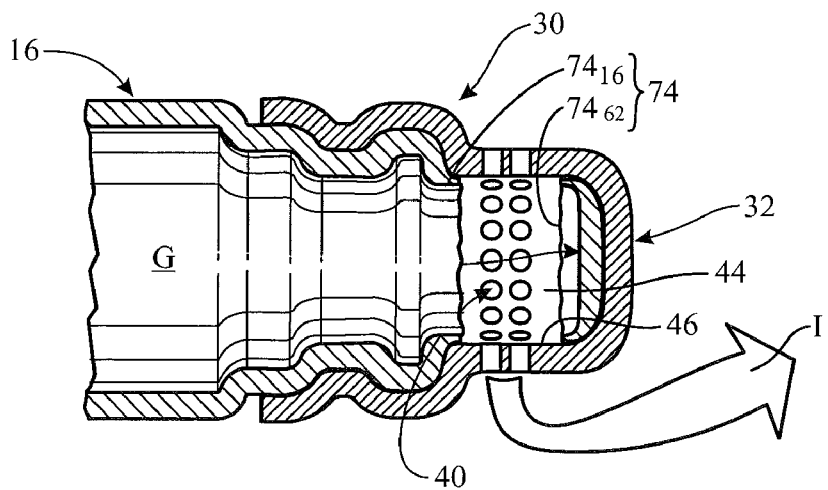

FIGS. 5A-5C constitute a series of diagrams depicting in temporal sequence stages in the operation of rupture feature 60 shown in FIGS. 3 and 4.

In FIG. 5A, a predetermined pressure impulse P arising in pressurized gas G in inflator 16 travels longitudinally within inflator 16 toward discharge end 14 thereof. There pressure impulse P impacts rupture fragment 62 with a force F that tends to drive rupture fragment 62 outwardly from inflator 16 into interior space 44 between diffuser 30 and inflator 16. Movement of rupture fragment 62 away from inflator 16 is, however, restrained by rupture membrane 66. Accordingly, force F gives rise in rupture membrane 66 to an amount of tension T sufficient to cause a complete transverse structural failure of rupture membrane 66 along a continuous fracture line 74. Rupture fragment 62 is no longer attached to inflator 16.

Consequently, rupture fragment 62 engages in motion M away from inflator 16 into interior space 44 and toward end wall 32 of diffuser 30. This is illustrated in FIG. 5B, where the edge $74_{62}$ of fracture line 74 along the portion of rupture membrane 66 attached to rupture fragment 62 has become separated from the edge $74_{16}$ of fracture line 74 along the portion of rupture membrane 66 attached to inflator 16. Pressurized gas G begins to be released from inflator 16 into interior space 44 and from there to escape radially from diffuser 30 through diffusion apertures 40 as inflation gas I that is destined to fill an associated passenger safety airbag.

Eventually, motion M of rupture fragment 62 is curtailed by the impact of rupture fragment 62 against end wall 32 of diffuser 30. Freed rupture fragment 62 is safely contained in this manner by diffuser 30 within interior space 44. Pressurized gas G from inflator 16 continues to be expelled from inflator 16 escaping through diffusion apertures 40 from diffuser 30 as inflation gas I.

Figure 6:
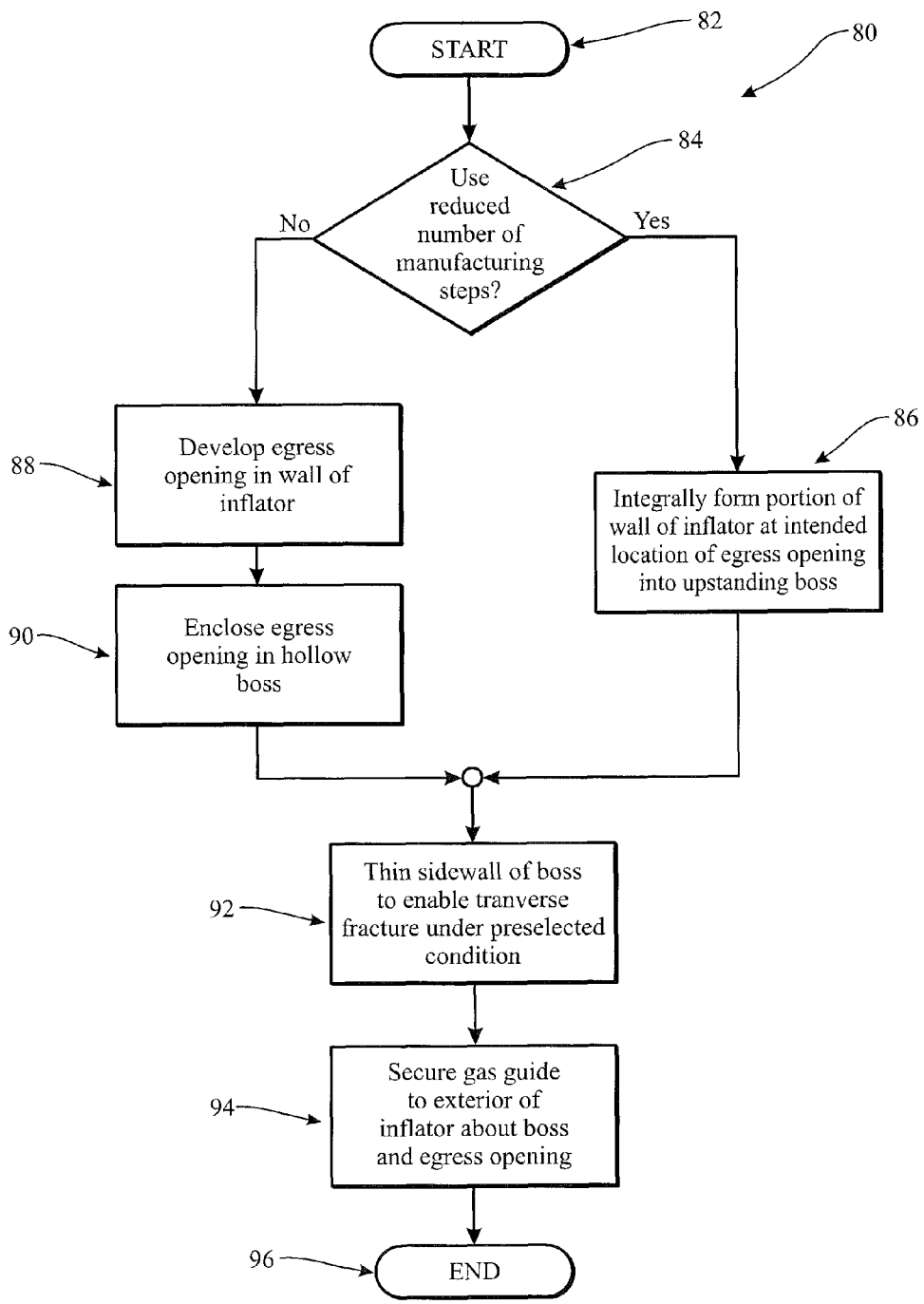
FIG. 6 is a flow chart of steps in an embodiment of a method for manufacturing a rupture feature for an inflator for a vehicle passenger safety airbag according to teachings of the present invention.

FIG. 6 is a flow chart of steps in an embodiment of a method 80 according to teachings of the present invention for manufacturing a rupture feature for an inflator for a vehicle passenger safety module.

Method 80 commences at initiation oval 82 and, as suggested in decision diamond 84, proceeds along alternative branching pathways, depending on whether or not a reduction is intended in the number of manufacturing steps to be employed in assembling the elements of a vehicle passenger safety module that includes an inflator rupture feature of the type produced in method 80. If manufacturing steps are to be reduced relative to the production of typical existing rupture features, then as indicated in instruction rectangle 86, the portion of the wall of the inflator at which it is intended to form a gas egress opening is integrally formed into an upstanding boss having a closed top remote from the inflator and a continuous sidewall sealingly connecting the top of the boss to the wall of the inflator about the egress opening. Otherwise, if manufacturing steps need not be reduced, method 80 proceeds toward a substantially similar structural result through the steps set forth in instruction rectangle 88 and in instruction rectangle 90. First a gas egress opening is developed communicating through a wall of the inflator.

Then, in a step that can involve a wide range of assembly options, some of which have been discussed above, the egress opening is enclosed in a hollow boss having a closed top remote from the inflator and a continuous sidewall sealingly connecting the top of the boss to the wall of the inflator about the egress opening. This step, which corresponds to the activity called for in instruction rectangle 90, might involve the assembly of a boss on the wall of the inflator about the egress opening using various distinct components, or the attachment to the wall of the inflator about the egress opening of a single-piece boss.

In any case, in due course, either before or after the completion of one or the other of the branches emanating from decision diamond 84, method 80 involves the step suggested in instruction rectangle 92 of thinning the sidewall of the boss to such an extent as to enable the complete transverse fracture of the sidewall under a preselected condition, namely upon the development in inflator of a pressure pulse of the type created in the inflator when a vehicle carrying the inflator is involved in a collision. The pressure pulse is adequate, given the degree of thinning effected to the sidewall of the boss, to fracture the top of the boss from the inflator by overloading the sidewall of the boss with tension. The thinning of the sidewall of the boss occurs during or after the formation of the boss, as in instruction rectangle 86, or as components of the boss are produced for assembly at the egress opening, as in instruction rectangle 88. Thinning can be accomplished by appropriately extruding, molding, or machining the portion of the boss that is to serve as the sidewall thereof. Thinning may even entail cutting into a surface of an otherwise not-so-thin sidewall a continuous grove that encircles the top of the boss. The floor of the groove then defines a region of the sidewall that will experience mechanical failure in the preselected condition discussed above.

Finally, as indicated in instruction rectangle 94, a suitable gas guide is secured to the exterior of the inflator about the boss and, therefore, about the egress opening, which is inside the boss. A typical such gas guide includes an end wall separated from and opposing the top of the boss and a continuous skirt having a first edge circumscribing the end wall of the gas guide and a second edge opposite therefrom attached to the exterior of the wall of the inflator about the sidewall of the boss. A plurality of diffusion apertures are formed through the skirt of the gas guide, affording escape outwardly from the gas guide for pressurized gas released from the inflator by the mechanical failure of the sidewall of the boss. The gas guide can be appropriately configured to safely capture and retain in confinement the top of the boss freed from the inflator by the failure of the sidewall of the boss. Method 80 concludes at termination oval 96.

By way of conclusion, the inventive technology functions in the following manner. First a pressure impulse is provided in the inflator by deploying a pyrotechnic device that is located in actuating proximity to pressurized inflation gas in the inflator. Then, the pressure impulse impinges on a structurally-sturdy portion of the inventive rupture feature indirectly causing a tension overload in and the complete structural failure of a frangible portion of the rupture feature that circumscribes the structurally-sturdy portion. The structurally-sturdy portion of the inventive rupture feature becomes a fragment that translates to a new location, allowing pressurized inflation gas to exit the inflator and then pass through a series of diffusion apertures of predetermined flow area in a gas guide that captures the translated fragment.

Precise control of the flow rate of inflation gas exiting the inflator is achieved without resort to additional inflator components or complexity. The size and shape of any fragment produced by the planned structural failure of the rupture feature are reliably predictably stable without need of additional inflator components or complexity. The fragment produced is securely captured and contained, thereby avoiding damage thereby to any associated safety airbag. Undesirable blockage of diffusion apertures is also precluded by the predictable shape and trajectory of any loosed rupture fragment.

The configuration and method of manufacture of the membrane portion of the inventive rupture feature obviates the need to resort to welding in or otherwise securing the membrane. This reduces scrap and the possibility of defects in the inflators being produced. Without welding surfaces a reduction is possible in the overall size of the inflators being produced, rendering those inflators suitable for use in smaller vehicles.

The present invention may be embodied in other specific forms without departing from its structures, methods, or other essential characteristics as broadly described herein and claimed hereinafter. The described embodiments are in all respects illustrative, rather than restrictive. The scope of the invention is, therefore, indicated by the appended claims, rather than by the foregoing description. All changes that come within the meaning and range of equivalency of the claims are to be embraced within their scope.

What is claimed is:

1. A rupture feature for releasing pressurized gas from an inflator for a vehicle passenger safety airbag, the rupture feature discharging the pressurized gas into a diffuser through an egress opening having predetermined dimensions in a wall of the inflator responsive to a predetermined pressure impulse arising in the inflator, the rupture feature comprising:
   (a) a sturdy rupture fragment of reliably stable configuration having an inner surface positioned opposite the egress opening in an orientation to be impacted by the predetermined pressure impulse through the egress opening; and
   (b) a relatively thin rupture membrane having a length extending away from the inner surface transverse to and continuously circumscribing the rupture fragment and the egress opening, the rupture membrane being integrally formed with the wall of the inflator and the rupture fragment and sealingly interconnecting the rupture fragment to the wall of the inflator about the egress opening such that a gas flow orifice created upon rupture of the rupture membrane a long a transverse fracture line has substantially the same dimensions as the egress opening.

2. A rupture feature as recited in claim 1, wherein a thickness of the rupture membrane is less than a thickness of the rupture fragment and less than a thickness of the wall of the inflator at the egress opening.

3. A rupture feature as recited in claim 1, wherein the length of the rupture membrane measured between the wall of the inflator and a periphery of the rupture fragment is constant about the egress opening.

4. A rupture feature as recited in claim 1, wherein the rupture membrane is integrally formed with the wall of the inflator and with the rupture fragment.

5. A rupture feature as recited in claim 1, wherein the rupture fragment is circularly symmetric.

6. A rupture feature as recited in claim 1, wherein the rupture fragment is substantially planar.

7. A rupture feature as recited in claim 1, wherein impact of the predetermined pressure impulse against the rupture fragment urges the rupture fragment away from the inflator, detaching the rupture fragment from the inflator by fully fracturing the rupture membrane along the transverse fracture line.

8. A rupture feature as recited in claim 7, wherein the fracturing of the rupture membrane permits the predetermined pressure impulse to drive the rupture fragment into the diffuser.

9. A pressurized gas release and diffusion assembly for a gas egress opening having predetermined dimensions in a wall of an inflator for a vehicle passenger safety airbag, the assembly comprising:
   (a) a gas guide secured to an exterior of the wall of the inflator about the egress opening;
   (b) a generally planar rupture fragment of reliably stable configuration having an inner surface mechanically associated with the wall of the inflator and disposed interior of the gas guide, the rupture fragment being positioned generally parallel to a transverse plane of the egress opening intermediate the egress opening and the gas guide; and
   (c) a continuous rupture membrane integrally formed with the inflator wall and with the rupture fragment and sealingly interconnecting a periphery of the rupture fragment to the wall of the inflator, the rupture membrane having a length extending away from the inner surface transverse to and circumscribing the egress opening such that a gas flow orifice created upon rupture of the rupture membrane a long a transverse fracture line has substantially the same dimensions as the egress opening.

10. An assembly as recited in claim 9, wherein the gas guide comprises:
   (a) an end wall separated from and opposing the egress opening;
   (b) a continuous skirt having a first edge circumscribing a periphery of the end wall and a second edge opposite therefrom attached to the exterior of the wall of the inflator about the egress opening; and
   (c) a plurality of circumferentially-spaced diffusion apertures formed through the skirt, the diffusion apertures affording escape radially outwardly from the assembly for pressurized gas from the inflator.

11. An assembly as recited in claim 9, wherein a thickness of the rupture membrane is less than a thickness of the rupture fragment and less than a thickness of the wall of the inflator at the egress opening.

12. An assembly as recited in claim 9, wherein pressurized gas in the inflator is released and diffused responsive to a predetermined pressure impulse arising in the inflator, the predetermined pressure impulse urging the rupture fragment away from the inflator, detaching the rupture fragment from the inflator along the transverse fracture line of the rupture membrane, and driving the rupture fragment against an inner surface of the gas guide.

13. A release structure for pressurized gas in an inflator for a vehicle passenger safety airbag, the release structure opening responsive to a predetermined pressure impulse arising in the inflator, and the release structure comprising:
   (a) a gas egress opening having predetermined dimensions formed through a wall of the inflator;
   (b) a barrier having an inner surface and positioned opposite the egress opening in an orientation to be impacted by the predetermined pressure impulse; and
   (c) a frangible sleeve sealingly interconnecting a periphery of the barrier to the wall of the inflator about the egress opening, the frangible sleeve having a length extending away from the inner surface transverse to and circumscribing the egress opening such that a gas flow orifice created upon rupture of the frangible sleeve along a transverse fracture line has substantially the same dimensions as the egress opening.

14. A release structure as recited in claim 13, wherein a thickness of the frangible sleeve is less than a thickness of the barrier and less than a thickness of the wall of the inflator at the egress opening.

15. A release structure as recited in claim 13, wherein impact of the predetermined pressure impulse against the barrier urges the barrier outwardly from the inflator, detaching the barrier from the inflator by fully transversely fracturing the frangible sleeve along the transverse fracture line.

16. A release structure as recited in claim 13, further comprising a gas guide secured to an exterior of the wall of the inflator enclosing the barrier and the frangible sleeve, the gas guide comprising:
   (a) an end wall separated from and opposing the barrier;
   (b) a continuous skirt having a first edge circumscribing a periphery of the end wall and a second edge opposite therefrom attached to the exterior of the wall of the inflator about the frangible sleeve; and
   (c) a plurality of circumferentially-spaced diffusion apertures formed through the skirt of the gas guide, the diffusion apertures affording escape radially outwardly from the release structure for the pressurized gas from the inflator.

17. A method for manufacturing a rupture feature for an inflator for a vehicle passenger safety airbag, the method comprising the steps of:
   (a) developing a gas egress opening having predetermined dimensions through a wall of the inflator;
   (b) enclosing the egress opening from an exterior of the inflator in a hollow boss having a closed top and an inner surface remote from the inflator and a continuous sidewall, the continuous sidewall having a length extending away from the inner surface transverse to the top of the boss and circumscribing the egress opening and sealingly connecting the top of the boss to the wall of the inflator about the egress opening; and
   (c) thinning the sidewall of the boss to such an extent that a predetermined pressure impulse arising in the inflator will, by urging the top of the boss away from the inflator, detach the top of the boss from the wall of the inflator by fully fracturing the sidewall of the boss along a transverse fracture line.

18. A method as recited in claim 17, further comprising the step of securing to the exterior of the wall of the inflator about the boss a gas guide comprising:
   (a) an end wall separated from and opposing the top of the boss;
   (b) a continuous skirt having a first edge circumscribing the end wall of the gas guide and a second edge opposite therefrom attached to the exterior of the wall of the inflator about the sidewall of the boss; and
   (c) a plurality of circumferentially-spaced diffusion apertures formed through the skirt of the gas guide, the diffusion apertures affording escape radially outwardly from the gas guide for pressurized gas from the inflator.

19. A method as recited in claim 17, wherein the step of developing and the step of enclosing are performed simultaneously in a step of integrally forming the portion of the wall of the inflator at the intended an intended location of the egress opening into the boss.

* * * * *